(12) United States Patent
Xu et al.

(10) Patent No.: US 12,743,069 B2
(45) Date of Patent: Sep. 22, 2026

(54) SYSTEM AND METHOD FOR SEMICONDUCTOR FABRICATING PROCESS

(71) Applicants: TAIWAN SEMICONDUCTOR MANUFACTURING COMPANY, LTD., Hsinchu (TW); TSMC CHINA COMPANY LIMITED, Shanghai (CN)

(72) Inventors: Lei Xu, Shanghai City (CN); Yukai Hou, Shanghai City (CN); Fangbo Guo, Shanghai City (CN); Bin Yuan, Shanghai City (CN); Jing Wang, Shanghai City (CN); Bo Li, Shanghai City (CN)

(73) Assignees: TAIWAN SEMICONDUCTOR MANUFACTURING COMPANY, LTD., Hsinchu (TW); TSMC CHINA COMPANY LIMITED, Shanghai (CN)

( * ) Notice: Subject to any disclaimer, the term of this patent is extended or adjusted under 35 U.S.C. 154(b) by 763 days.

(21) Appl. No.: 18/188,260

(22) Filed: Mar. 22, 2023

(65) Prior Publication Data

US 2024/0241495 A1 Jul. 18, 2024

(30) Foreign Application Priority Data

Jan. 18, 2023 (CN) ........................ 202310073282.7

(51) Int. Cl.
*G05B 19/18* (2006.01)

(52) U.S. Cl.
CPC .. *G05B 19/188* (2013.01); *G05B 2219/45031* (2013.01)

(58) Field of Classification Search
None
See application file for complete search history.

(56) References Cited

U.S. PATENT DOCUMENTS 5,971,711 A * 10/1999 Noji ........................ F04D 25/16 417/2
10,211,110 B1 2/2019 Kamakura et al.
(Continued)

FOREIGN PATENT DOCUMENTS

CN 109545701 A 3/2019
TW M279017 U 10/2005
TW 201515130 A 4/2015

*Primary Examiner* — Paul B Yanchus, III
(74) *Attorney, Agent, or Firm* — Maschoff Brennan

(57) ABSTRACT

A method includes using a first pump apparatus to control a pressure condition of a first chamber, wherein the first pump apparatus produces a first operation data in a first digital protocol format; using a second pump apparatus to control a pressure condition of a second chamber, wherein the second pump apparatus produces a second operation data in a second digital protocol format different from the first digital protocol format; receiving, by a box device, the first operation data in the first digital protocol format and the second operation data in the second digital protocol format; decoding, by the box device, the first operation data in the first digital protocol format and the second operation data in the second digital protocol format; determining whether the first operation data is in an acceptable range; and adjusting the first pump apparatus to set the first operation data within the acceptable range.

20 Claims, 12 Drawing Sheets

(56) References Cited

U.S. PATENT DOCUMENTS

| | | | | |
|---|---|---|---|---|
| 2009/0327511 | A1 * | 12/2009 | Kim | H04L 41/0226 709/232 |
| 2022/0247595 | A1 * | 8/2022 | Hung | H04L 12/40032 |
| 2024/0379221 | A1 * | 11/2024 | Seekup | A61M 16/0051 |

* cited by examiner

SYSTEM AND METHOD FOR SEMICONDUCTOR FABRICATING PROCESS

PRIORITY CLAIM AND CROSS-REFERENCE

This application claims priority to China application Ser. No. 20/2310073282.7, filed Jan. 18, 2023, which is herein incorporated by reference.

BACKGROUND

Semiconductor fabrication requires a plurality of fabrication tools. These fabrication tools use internal or external sensors that measure fabrication process parameters such as temperature, current, voltage, or pressure. However, the large quantities and wide distribution of the parameters lead to high loading on engineers. Sometimes, the parameters are manually recorded, which may lead to uncontrollable mis-operation factors. Therefore, existing semiconductor fabrication tools have not been entirely satisfactory in every aspect.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
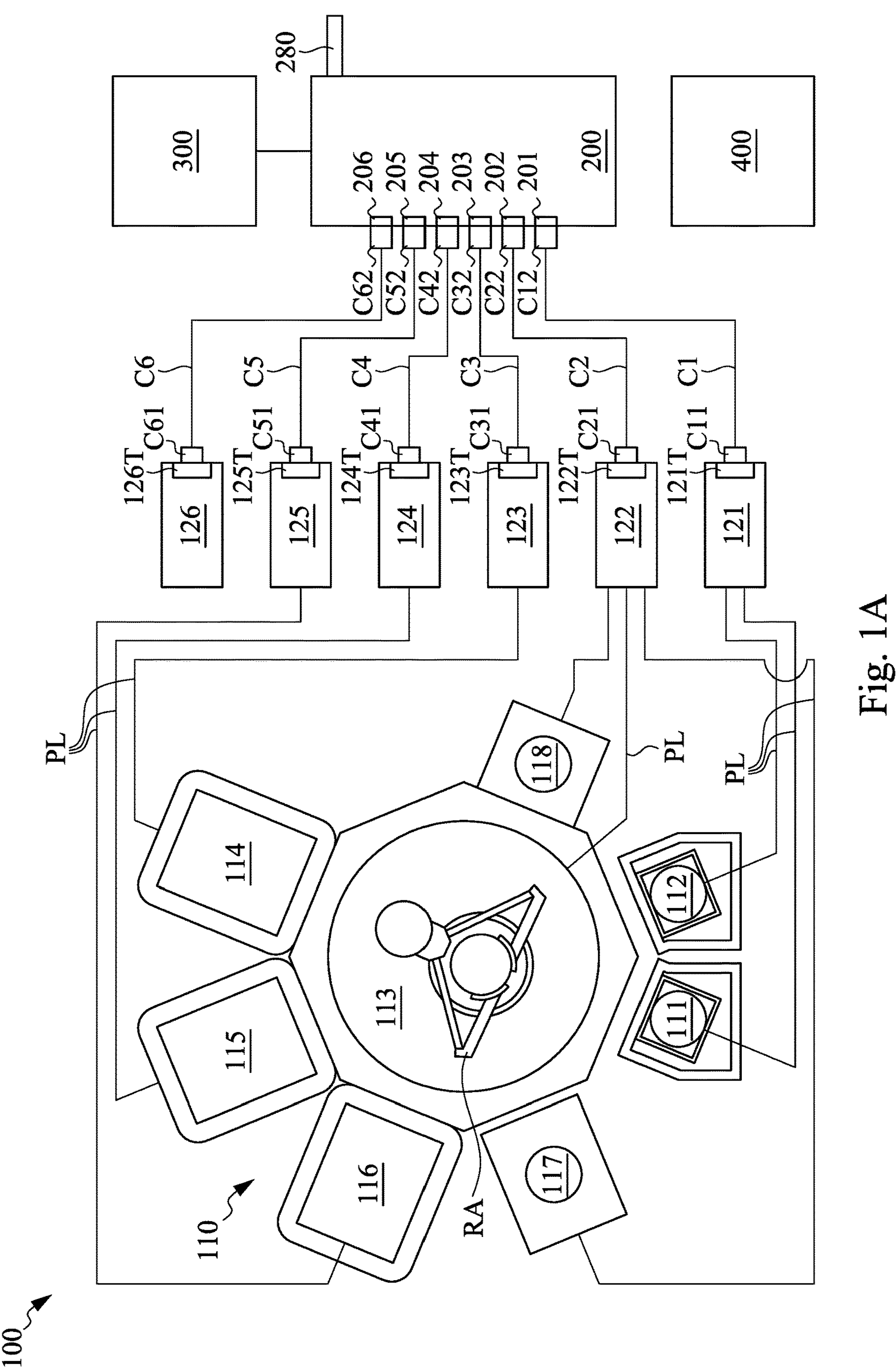
FIG. 1A is a diagrammatic top view of a semiconductor fabrication system according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, "around," "about," "approximately," or "substantially" shall generally mean within 20 percent, or within 10 percent, or within 5 percent of a given value or range. Numerical quantities given herein are approximate, meaning that the term "around," "about," "approximately," or "substantially" can be inferred if not expressly stated.

FIG. 1A is a diagrammatic top view of a semiconductor fabrication system 100. In the illustrated embodiments, the semiconductor fabrication system 100 includes a cluster tool 110, plural auxiliary apparatuses 121-126, a box device 200, and a display device 300. One or plural of the auxiliary apparatuses 121-126 may be coupled to the cluster tool 110. The box device 200 may receive operation data from the auxiliary apparatuses 121-126 respectively through connectors C1-C6, and transmit the operation data to the display device 300. Through the configuration, the operation data from the auxiliary apparatuses 121-126 are displayed on a display screen of the display device, and can be observed by operators/inspectors in a real-time manner.

The cluster tool 110 may include load lock chambers 111, 112, a wafer handling chamber 113, plural processing chambers 114-116, and plural auxiliary chambers 117 and 118. The cluster tool 110 may also include other chambers, such as wait chambers between the wafer handling chamber 113 and the load lock chambers 111, 112 in some other embodiments. The load lock chambers 111 and 112 may be configured for transferring wafers into and out of the cluster tool 110, respectively. In various embodiments, the cluster tool 110 (including the wafer handling chamber 113, the processing chambers 114-116, and the plural auxiliary chambers 117 and 118) is under vacuum, and the load lock chambers 111 and 112 may "pump down" the wafers introduced into the cluster tool 110 (e.g., by way of the vacuum system). In some embodiments, the load lock chambers 111 and 112 may be adapted to receive and release a single wafer or a plurality of wafers (e.g., loaded into a cassette). By way of example, the load lock chambers 111 and 112 may be separated from the wafer handling chamber 113 by way of a gate valve, allowing the wafer handling chamber 113 to remain under vacuum when one or both of the load lock chambers 111 and 112 are vented.

The wafer handling chamber 113 may also be referred to as a buffer chamber. In various embodiments, the wafer handling chamber 113 is equipped with a transfer arm RA (e.g., robotic transfer arm). The transfer arm RA may automatically move smoothly along any of a horizontal and/or vertical axis, so as to transfer wafers/substrates between the load lock chambers 111 and 112 and any of the chambers 114-118.

The processing chambers 114-116 may be configured to perform a number of substrate processing operations, such as atomic layer deposition (ALD), chemical vapor deposition (CVD), physical vapor deposition (PVD), etching, film coating, pre-treatment/pre-soak, de-gassing, as well as annealing, and/or other suitable processing or operations in front-end-of-line (FEOL) or back-end-of-line (BEOL) process. For example, one or more of the processing chambers 114-116 may be configured to deposit various dielectric layers and metal layers (e.g., TiN layer, AlCu layer, or the like), coat an anti-reflection layer, thermally pre-treat the wafers, and/or other suitable processing or operations. In various embodiments, the cluster tool 110 may have more or less processing chambers, for example, for a desired process to be performed by the cluster tool 110. The auxiliary chamber 117 may be a cool-down chamber. The auxiliary chamber 118 may be an orienter chamber.

In the semiconductor fabrication process conducted by the semiconductor fabrication system 100, a wafer may be transferred from one of the load lock chambers 111 and 112 to the processing chamber 114 (e.g., via the wafer handling chamber 113) for being subjected to a first process. In some embodiments, the wafer moved from said one of the load lock chambers 111 and 112 may be oriented in the auxiliary chamber 118 first, prior to entering the processing chamber 114. In some embodiments, the wafer may be transferred from the processing chamber 114 to the processing chamber 115 (e.g., via the wafer handling chamber 113) for being subjected to a second process, and the wafer may then be transferred from the processing chamber 115 to the processing chamber 116 (e.g., via the wafer handling chamber 113) for being subjected to a third process. In some embodiments, after the first, second, and/or third processes, the wafer may then be transferred from the processing chamber 114, 115, or 116 to the auxiliary chamber 117 (e.g., via the wafer handling chamber 113) for being cooled down. The wafer that is processed through the first, second, and/or third process, may be transferred to the other of the load lock chambers 111 and 112 for exiting the cluster tool 110.

Each of the auxiliary apparatuses 121-126 may be a dry pump, a mechanical pump, a turbo pump, a turbomolecular pump, a cryopump, a GAS storage cabinet, other appropriate vacuum pump, or the combination thereof. In some embodiments, some or all of the auxiliary apparatuses 121-126 are machines of different type/models or different manufacturers, and thus may use different ports and different digital protocol formats to transmit their operation data. Stated differently, some or all of the auxiliary apparatuses 121-126 encode the operation data thereof in different protocol formats. In the illustrated embodiments, the auxiliary apparatuses 121-125 are pump machines configured to control a pressure condition of the chambers, and the auxiliary apparatus 126 is a GAS storage cabinet that stores gas bottles. For example, various protocol formats are used for plural EBARA pump apparatus (e.g., A70W, A30W, AAS200WN, ESR80WN, A10S, A150W-M etc.) and/or EDWARDS pump apparatus (e.g., IH600, IH1000, IXL120, IXH1210, IXL600N). For example, the auxiliary apparatus 121 may be EBARA A70/A30 or the like, the auxiliary apparatus 122 may be EBARA A70/AAS900 or the like, the auxiliary apparatuses 123-125 are EBARA AAS200/AAS90/A70W, EDWARDS IH600/IH1000, or the like. The auxiliary apparatus 126, which is GAS storage cabinet, may use its own protocol format different from that of the auxiliary apparatuses 121-125. The various protocol formats may include binary format, ASCII format, or the like.

In some embodiments, these various protocol formats of the auxiliary apparatuses 121-126 may be communicated over a same communication protocol (e.g., having the same Baud Rate), such as RS232. Each of the auxiliary apparatuses 121-126 may have an interface 121T/122T/123T/124T/125T/126T for data communication, in which some or all of the interfaces 121T-126T may be different from each other. The interfaces 121T-126T may also be referred to as output ports.

In some embodiments, the operation data from the auxiliary apparatuses 121-126 may include various parameters, such as pressures, temperatures, currents, gas flow, operation time duration, voltages applied on motors, the like, or the combination thereof. In some embodiments, the operation data from the auxiliary apparatuses 121-126 may further include the types/models and the manufacturers of the auxiliary apparatuses 121-126 and chambers coupled with the auxiliary apparatuses 121-125.

In the illustrated embodiments, the load-lock chambers 111 and 112 may be coupled to the auxiliary apparatus 121, the wafer handling chamber 113 may be coupled to the auxiliary apparatus 122, and the process chambers 114-116 may be respectively coupled to the auxiliary apparatus 123-125. The auxiliary chambers 117 and 118 may also be coupled to the auxiliary apparatus 122 that the wafer handling chamber 113 is coupled to. In some other embodiments, the coupling between the chambers 111-118 and the auxiliary apparatuses 121-125 is made in a different way. For example, the load-lock chambers 111 and 112 may be coupled to two separate auxiliary apparatuses in some other embodiments.

The box device 200 may receive the operation data of the auxiliary apparatuses 121-126 in different digital protocol formats. The box device 200 may include a stand-alone power system. In the present embodiments, the connectors C1-C6 may also be referred to as cables. When a cable (e.g., one of the connectors C1-C6) is connected between the auxiliary apparatus (e.g., one of the auxiliary apparatuses 121-126) and the box device 200, the stand-alone power system in the box device 200 will automatically identify the type of the auxiliary apparatuses 121-126 and use its corresponding protocol format for data acquisition. For example, the stand-alone power system in the box device 200 may include suitable protocol decoder for decoding the operation data of the auxiliary apparatuses 121-126 according to their protocol format. The protocol decoder may analyze the logic signals and interpret it according to a specific protocol format. If the stand-alone power system in the box device 200 does not include a suitable decoder, a decoder program capable of analyzing the decoding data according to a specific protocol formats also can be installed remotely via USB or network.

In the present embodiments, connectors C1-C6 respectively connect the auxiliary apparatuses 121-126 to the box device 200, thereby transmitting data for data parsing and analysis. Each of the connectors C1-C6 may have a first interface (e.g., one of the interfaces C11-C61) coupled to one of the interfaces 121T-126T of the auxiliary apparatuses 121-126 and a second interface (e.g., one of the interfaces C12-C62) coupled to one of the ports 201-206 of the box device 200. In some embodiments, the interfaces C12-C62 of the connectors C1-C6 may be of a same type, for example RJ45. In some embodiments, as some or all of the interfaces 121T-126T of the auxiliary apparatuses 121-126 may be of different types, some or all of the interfaces C11-C61 of connectors C1-C6 may be of different types from each other. The connectors C1-C6 may be a N-to-one connector or a one-to-one connector.

Figure 1B:
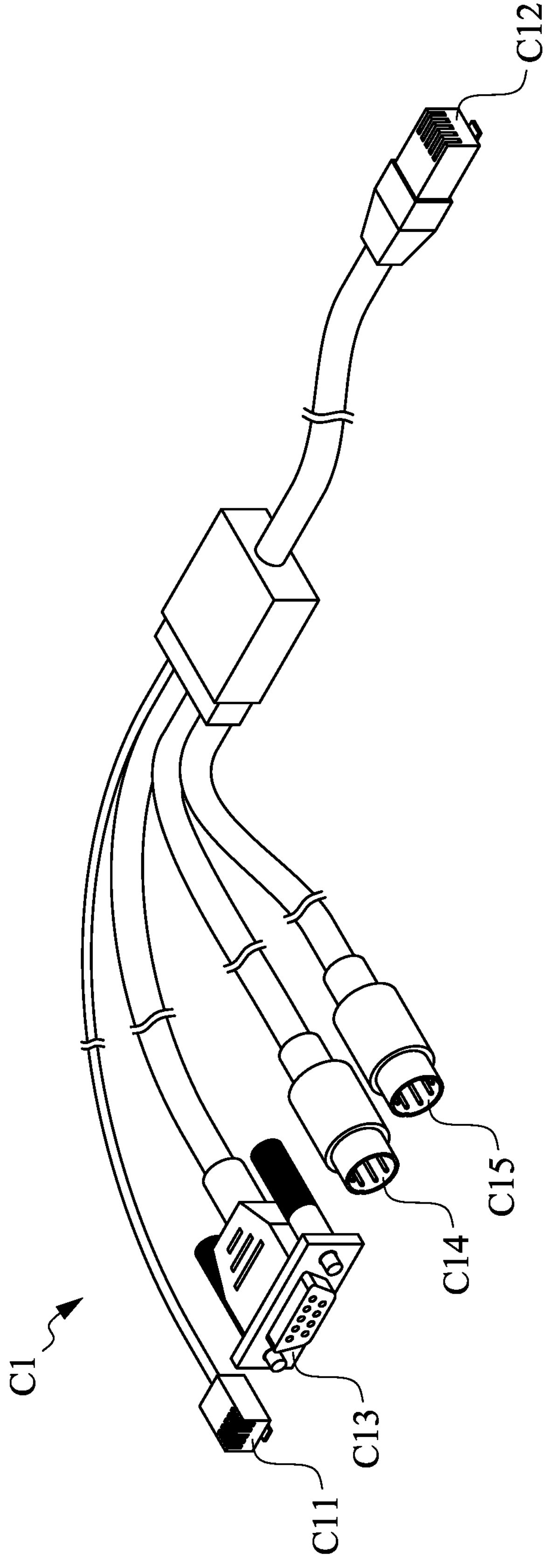
FIG. 1B shows a schematic diagram of a N-to-one connector according to some embodiments of the present disclosure.

FIG. 1B shows a schematic diagram of a N-to-one connector C1 according to some embodiments of the present disclosure. The connectors C2-C6 in FIG. 1A may have the same N-to-one configuration as the connector C1 as shown in FIG. 1B, and thus not shown by figures. In the present embodiments, the connectors C1 includes one interface C12 to couple to the box device 200 (referring to FIG. 1A) and N interfaces (e.g., four interfaces C11, C13, C14, and C15), one of which is to be selected to couple the auxiliary apparatus 121 (referring to FIG. 1A). In some embodiments, the interfaces C11-C15 of the connectors C1 are of different types from each other. For example, the interface C12 may be RJ45, and the interfaces C11, C13, C14, and C15 may include RJ11/12, 9-pin circular interface, 9-pin com port, and 4-pin circular interface, respectively. Depending on the type of the interface 121T of the auxiliary apparatus 121 (referring to FIG. 1A), one of the interfaces C11, C13, C14, and C15 of the connectors C1 may be selected and used. In the illustrated embodiments in FIGS. 1A and 1B, the interface C11 of the connector C1 is selected to be coupled with the interface 121T of the auxiliary apparatus 121, and other interfaces C13-C15 of the connector C1 are not coupled with any auxiliary apparatus. Stated differently, the other interfaces C13-C15 of the connector C1 are inactive (e.g., floating).

In some embodiments, all the connectors C1-C6 are N-to-one connectors. The connectors C2-C6 may have the same configuration as the connector C1, but various interfaces may be selected to be coupled with the interfaces 122T-125T of the auxiliary apparatuses 122-125 (referring to FIG. 1A). For example, each of the connector C2-C6 may use an interface having an appearance like one of the interfaces C13-C15, to couple the interfaces 122T-126T of the auxiliary apparatuses 122-126 (referring to FIG. 1A). Some or all of the interfaces of the connector C2-C6 may be different from each other. In some other embodiments, some of the connectors C1-C6 may are N-to-one connectors, and other of the connectors C1-C6 are one-to-one connectors. For example, a one-to-one connector C1 has only the interfaces C11 and C12. In some other embodiments, all the connectors C1-C6 are one-to-one connectors.

The display device 300 may receive the operation data of the auxiliary apparatuses 121-126 in the same communication protocol (e.g., RS232) as that of the auxiliary apparatuses 121-126, and display the operation data on the display screen thereof. In some embodiments, the display device 300 receive the operation data of the auxiliary apparatuses 121-126 after the box device 200 decodes the operation data of the auxiliary apparatuses 121-126 according their specific formats. As aforementioned, the operation data may include the various parameters, such as pressure, temperature, current, gas flow, operation time duration, voltages applied on motors, the like, or the combination thereof. The operation data may also include the type/model and the manufacturer of the auxiliary apparatuses 121-126, and the ports 201-206 of the box device 200 coupled to the auxiliary apparatuses 121-126. In some embodiments, the stand-alone power system in the box device 200 may instruct the display device 300 to show a chamber information coupled to the auxiliary apparatuses 121-126. In some embodiments, the stand-alone power system in the box device 200 may instruct the display device 300 to show a warning and alarm signal that indicates if the parameters are out of control. The operation data and the warning and alarm signal can be shown in a real-time manner. In some embodiments, if the operation data exceed a critical/threshold value, the system in the box device 200 will automatically send a message to a corresponding one of the auxiliary apparatuses 121-126 to stop the corresponding one of the auxiliary apparatuses 121-126 and send an alert mail to related operators/inspectors.

In some embodiments, an external application program 400 can be coupled to the box device 200. The box device 200 is capable of converting the operation data of the auxiliary apparatuses 121-126 in the same communication protocol (e.g., RS232) into another communication protocol of the external application program 400. The communication protocol conversion is performed after the box device 200 decodes the operation data of the auxiliary apparatuses 121-126 according their specific formats. For example, the communication protocol of the external application program 400 may use Transmission Control Protocol/Internet Protocol (TCP/IP), User Datagram protocol (UDP), or SEMI Equipment Communication Standard (SECS) protocol for communication. The box device 200 may include a build-in protocol conversion system, which automatically perform the conversion from the communication protocol of the auxiliary apparatuses 121-126 to the communication protocol of the external application program 400. For example, a request from the external application program 400 is sent automatically to the box device 200, and the protocol conversion system of the box device 200 performs the communication protocol conversion according to the request. The build-in protocol conversion system can be upgraded remotely via USB or network. Various multi-communication methods, such wired (e.g., through an Gigabit Ethernet (GigE) interface 270 in FIGS. 3A-3C), wireless (e.g., WIFI and Bluetooth)(e.g., the wireless transceiver 280 in FIGS. 3A-3C), etc., can be used for convenience to allow external application program 400 to access the box device 200 according to the communication protocol of the external application program 400. By communication with the box device, the external application program 400 may obtain the operation data of the auxiliary apparatuses 121-126, and determine to stop the cluster tool 100 and/or hold lot when the operation data of the auxiliary apparatuses 121-126 is OOC or OOS.

Figure 2:
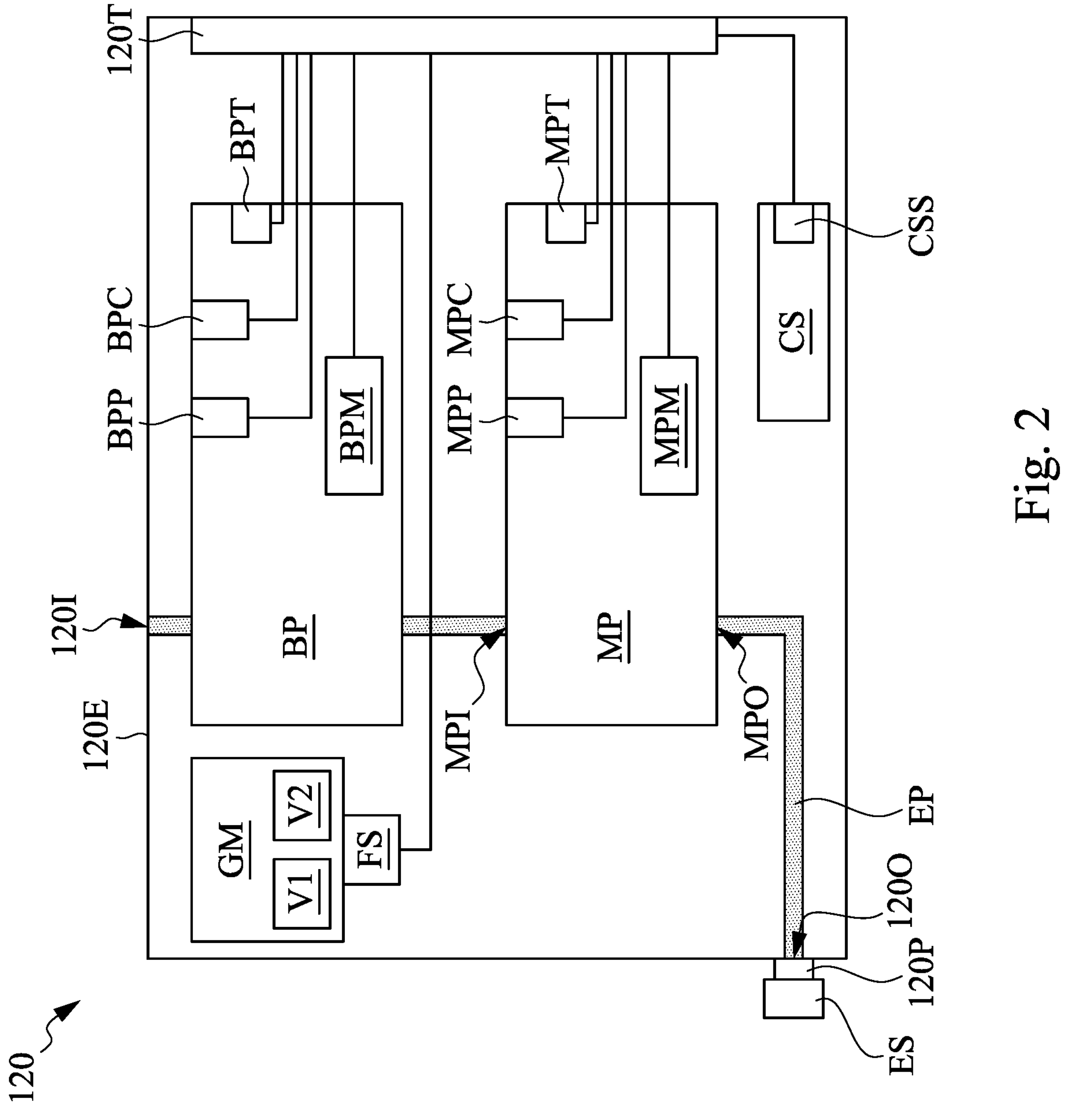
FIG. 2 is a block diagram of a pump auxiliary apparatus according to some embodiments of the present disclosure.

FIG. 2 is a block diagram of a pump auxiliary apparatus 120 according to some embodiments of the present disclosure. The configuration of the auxiliary apparatuses 121-125 in FIG. 1A are simplified as the pump auxiliary apparatus 120 illustrated herein, in which the interfaces 121T-125T are represented as an interface 120T of the pump auxiliary apparatus 120. The pump auxiliary apparatus 120 operates at pressures between atmospheric and ultimate vacuum. The pump auxiliary apparatus 120 may include a main pump MP and a booster pump BP fitted to the inlet MPI of the main pump MP. The main pump MP and the booster pump BP are fluidly connected between a gas inlet 120I and a gas outlet 120O of the pump auxiliary apparatus 120. The gas inlet 120I may be fluidly connected with the chambers (e.g., chambers 111-118 in FIG. 1A) by suitable pipes (e.g., pipes PL in FIG. 1A). The main pump MP and the booster pump BP may respectively have motors MPM and BPM. All of the components of the pump auxiliary apparatus 120 are fitted inside an enclosure 120E.

In some embodiments, the main pump MP is rotary pump driven by the motor MPM. For example, the main pump MP is a five-stage, positive displacement rotary pump in which pairs of intermeshing rotors (of different profiles mounted on common shafts) are held in correct phase relation by a pair of timing-gears, which may be mounted on a shaft driven by the motor MPM. The motor MPM can operate a suitable voltage according to the types of the pump auxiliary apparatus 120.

In some embodiments, the booster pump BP is a vacuum pump driven a motor BPM. For example, the booster pump BP is a positive displacement roots vacuum pump, in which the pump mechanism is driven directly by a three-phase electric motor BPM. The booster pump BP is backed by the main pump MP. For a first type of the pump auxiliary apparatus 120, when the main pump MP starts, the pump auxiliary apparatus 120 delays the start of the booster pump BP for a preset time, to allow the main pump MP to reduce the pressure in the process system to below the maximum inlet pressure for the booster pump BP. For a second type of the pump auxiliary apparatus 120, the booster pump BP operates between atmospheric pressure and ultimate vacuum; when the main pump MP starts, the booster pump BP is also started. The motor BPM can operate a suitable voltage according to the types of the pump auxiliary apparatus 120.

Each of the main pump MP and the booster pump BP may include a plurality of sensors to monitor conditions of the main pump MP and the booster pump BP. For example, the main pump MP may have a pressure sensor MPP, a temperature sensor (e.g., thermocouple) MPT, and a current sensor MPC. For example, the booster pump BP may have a pressure sensor BPP, a temperature sensor BPT, and current sensor BPC.

The pressure sensor MPP may be configured to real-time monitor a pressure of the main pump MP. The temperature sensor MPT may be fitted to a pump body of the main pump MP to measure a temperature of the pump body of the main pump MP. The current sensor MPC may be configured to real-time monitor an electric current of the main pump MP.

The pressure sensor BPP may be configured to real-time monitor a pressure of the booster pump BP. The temperature sensor BPT may be fitted to a pump body of the booster pump BP to measure a temperature of the pump body of the booster pump BP. The current sensor BPC may be configured to real-time monitor an electric current of the booster pump BP. The current sensors MPC and BPC also provides accurate and repeatable measurement on both AC and DC power. Measuring power input can help improve efficiency, safeguard personnel, and reduce motor maintenance costs in a wide range of factory applications. One or more of the pressure sensor MPP, the temperature sensor MPT, the current sensor MPC, and the pressure sensor BPP, the temperature sensor BPT, and the current sensor BPC may be omitted in some embodiments.

In some embodiments, the outlet MPO of the main pump MP is connected to an exhaust pipe EP, for example, below the main pump MP. An outlet of the exhaust pipe EP (i.e., the outlet 120O) may be connected to an external system/device ES for receiving the exhaust gas. The external system/device ES may be an exhaust treatment system or an external pipe (e.g., elbow). An exhaust temperature sensor 120P may be arranged at the end of the exhaust pipe EP (between the external system/device ES and the exhaust pipe EP) to provide an indication of exhaust gas temperature.

In some embodiments, the pump auxiliary apparatus 120 may include a gas module GM. The gas module GM may supply pressurized nitrogen to a labyrinth seal section, isolating the vapor stream from the components in the pump, thereby enabling the pump to draw a clean vacuum. In some embodiments, additional $N_2$ gas, injected in various pump stages, reduces corrosion due to process gas and retards the accumulation of reaction byproducts. The gas module GM may include a dilution $N_2$ gas control valve V1, which adjust the regulation $N_2$ pressure to the specified value to supplies the correct amount of $N_2$ gas for various types of purge operation. A flow sensor (e.g., flowmeter) FS may be fluid communicated with the gas module GM to measure the dilution $N_2$ flow. In some embodiments, the gas module GM may further include a selector valve V2 configured to stop completely the dilution $N_2$ flow. For example, for processes that do not produce corrosion or reaction byproducts, the selector valve V2 may be used to stop completely the dilution $N_2$ flow.

In some embodiments, the pump auxiliary apparatus 120 may include a cooling system CS configured to cool down the motor MPM, the motor BPM, or the combination thereof. The cooling system CS may control a cool water flow, which may be detected by a flow sensor (e.g., flowmeter) CSS. The cooling system CS may include cooling water couplers to make connection and disconnection.

These sensors (e.g., the pressure sensors MPP and BPP, the temperature sensors MPT and BPT, the current sensors MPC and BPC, the exhaust temperature sensor 120P, the flow sensors FS and CSS) may be electrically connected to the interface 120T for data communication with the box device 200. For example, the sensors (e.g., the pressure sensors MPP and BPP, the temperature sensors MPT and BPT, the current sensors MPC and BPC, the exhaust temperature sensor 120P, the flow sensors FS and CSS) may produce detected parameters (e.g., the pressures, the temperatures, the electric currents, the exhaust temperature, the cool water flow, and gas flow).

In some embodiments, some control components (e.g., the motors MPM and BPM, and the flow sensor CSS) may be electrically connected to the interface 120T for data communication with the box device 200. For example, control components (e.g., the motors MPM and BPM, and the flow sensor CSS) may produce control parameters (e.g., the operation voltages of motors). In some further embodiments, the pump auxiliary apparatus 120 may include other sensors (e.g., safety sensor, exhaust temperature sensor, flow meter, or the like) and control components (e.g., temperature controller, or the like), which may produce corresponding parameters. These sensors and control components may be electrically connected to the interface 120T for data communication with the box device 200.

Figure 3A:
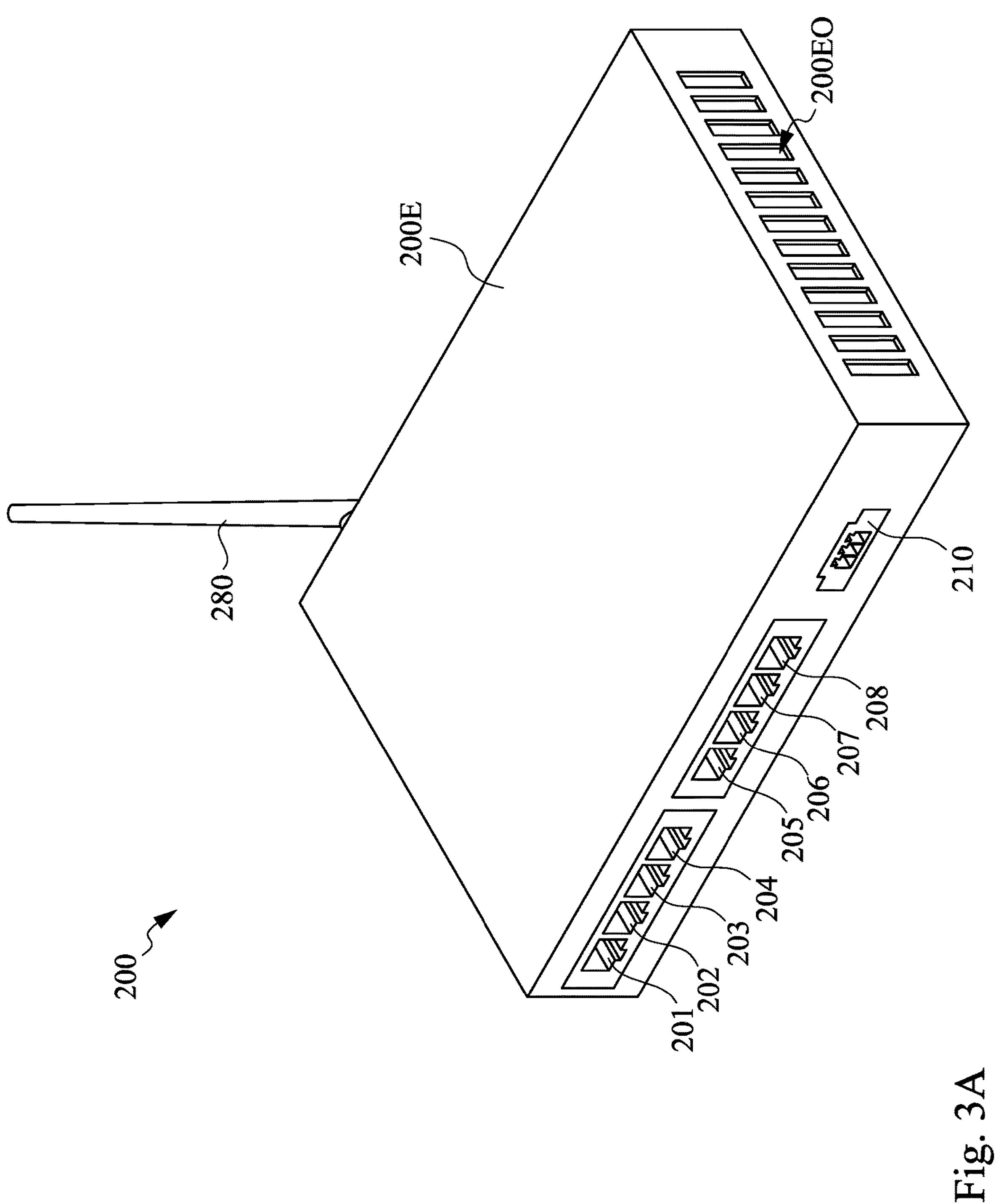
FIG. 3A is a perspective view of a box device according to some embodiments of the present disclosure.
Figure 3B:
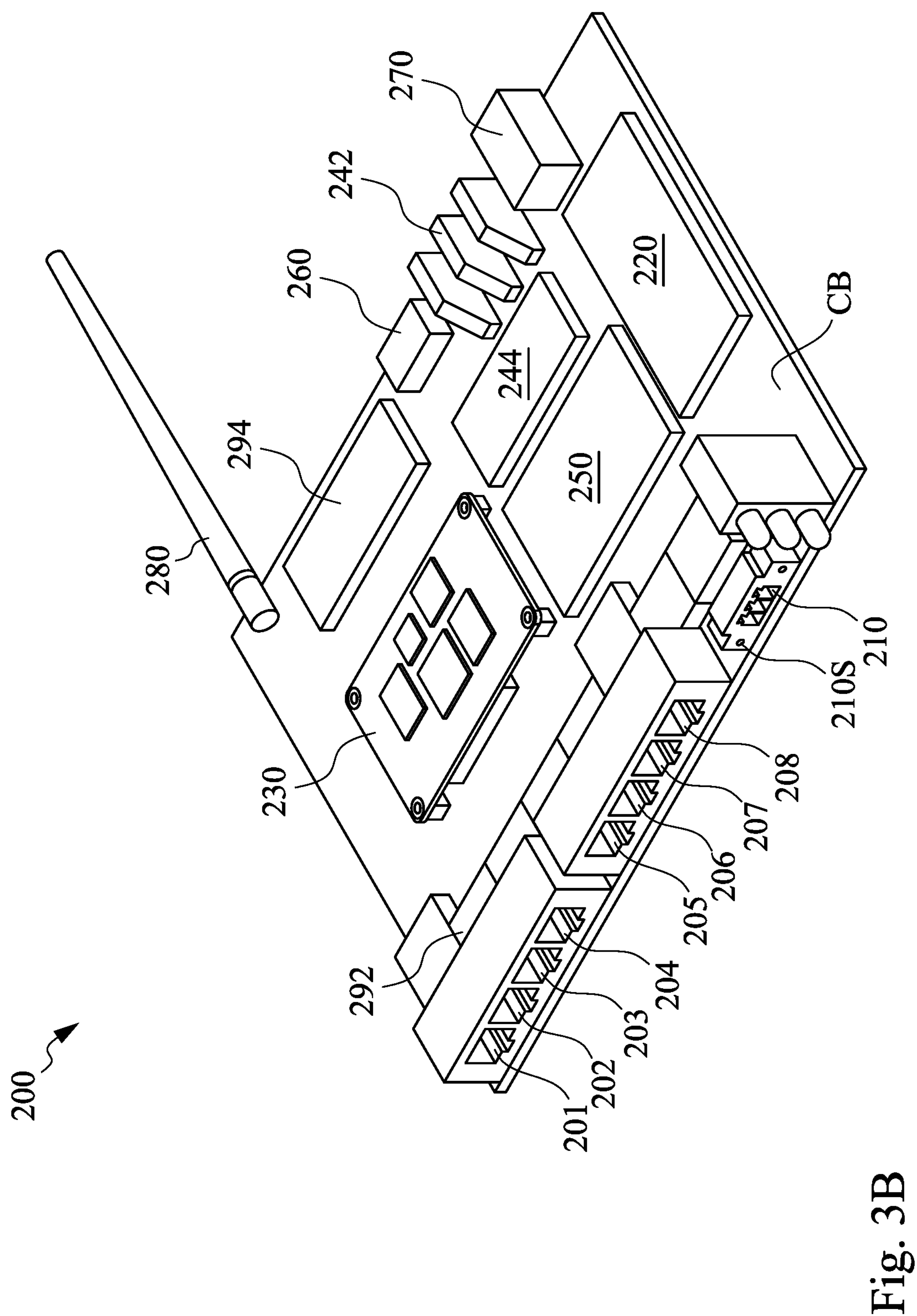
FIG. 3B is a perspective view of the box device of FIG. 3A without an enclosure.
Figure 3C:
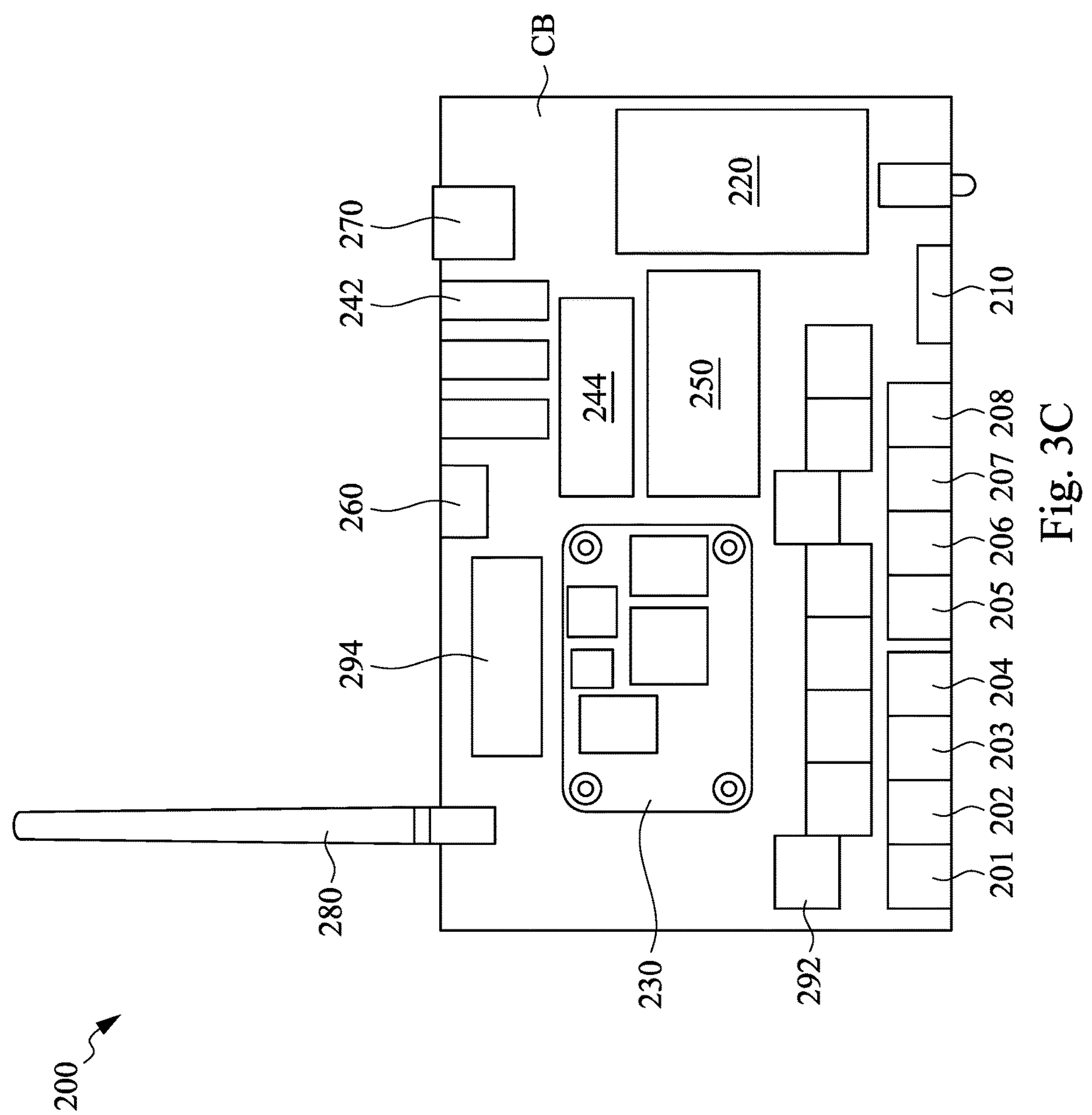
FIG. 3C is a top view of the box device of FIG. 3B.

FIG. 3A is a perspective view of a box device 200 according to some embodiments of the present disclosure. FIG. 3B is a perspective view of the box device 200 of FIG. 3A without an enclosure (e.g., the enclosure 200E in FIG. 3A). FIG. 3C is a top view of the box device 200 of FIG. 3B. The box device 200 may include an extension board CB, a power connector 210, a power circuit 220, a computing module 230, ports 201-208, USB ports 242, a USB interface circuit 244, a serial port bridge circuit 250, a HDMI port 260, a GigE port 270, a wireless transceiver 280, plural isolation transceiver modules 292, an interface buffer 294, and an enclosure 200E. The box device 200 may be a RS232 high-speed isolated transceiver module.

The extension board CB is arranged inside the enclosure 200E. The extension board CB may expand the number of the equipment communication ports. In the present embodiments, the number of equipment communication ports is expanded to eight, for example, the eight communication ports 201-208. The communication ports 201-208 may also be referred to as serial ports. The number of ports expansion is determined according to the demand. In some embodiments, the extension board CB may also be provided with USB ports (e.g., the USB ports 242), a HDMI port (e.g., the HDMI port 260), a VGA port, a network port (e.g., GigE port 270), the like, and the combination thereof. In some embodiments, the equipment communication port (e.g., the ports 201-208) receive the operation data from the auxiliary apparatuses 121-126, and the operation data are processed by the computing module 230 and then sent to the USB ports 242, the HDMI port 260, or the GigE port 270 to communicate with suitable equipment/device. For example, the USB ports 242, the HDMI port 260 may allow the connection with the display device 300. The GigE port 270 may allow to communicate with other equipment/device through a network.

In some embodiments, the power connector 210 is mounted on the extension board CB and configured to receive an electrical power from a power supply. The power circuit 220 may connect the power connector 210 to the computing module 230, thereby supplying power to the computing module 230. In some embodiments, the power connector 210 is a lock power connector with screw holes 210S, which may receive screws of the power supply. Once the power connector 210 is connected to the power supply, the computing module 230 are activated. For example, the computing module 230 is capable of receiving signals from the ports 201-208 and sending signals to GigE port 270 and the wireless transceiver 280. The computing module 230 may convert the signals from the ports 201-208 in a communication protocol (e.g., RS232) of the auxiliary apparatuses 121-126 to another communication protocol of other components (e.g., external application program of external equipment or website platform) communicated through the GigE port 270 and the wireless transceiver 280. The computing module 230 may include various components, which are further illustrated in FIGS. 4A and 4B later.

For easily connecting the various auxiliary apparatuses 121-126 to the box device 200, the communication ports 201-208 of the box device 200 are designed as a same type of interfaces for convenience. For example, the communication ports 201-208 are RJ45, which has a small size, thereby facilitate the plural ports (e.g., the ports 201-208) integrated in one box device. In some embodiments, while the communication ports 201-208 are RJ45, the communication protocol of the auxiliary apparatuses 121-126 is RS232.

In some embodiments, the computing module 230 may provide one USB interface. The USB interface circuit 244 may be connected to the USB interface of the computing module 230 and expand it to four USB interfaces. Stated differently, the USB interface circuit 244 may convert/divide the one USB interface of the computing module 230 into four USB interfaces. Two of the USB interfaces of the USB interface circuit 244 may be electrically coupled to the USB ports 242. A desired operating system, a desired protocol conversion system, and/or a desired protocol format decoder program can be installed in the computing module 230 remotely via USB ports 242 or network port (e.g., GigE interface 270). In some embodiments, some input devices (e.g., keyboard or mouse) may be electrically connected with the box device 200 through the USB ports 242. In some embodiments, the box device 200 may receive command from operators through the input devices and adjust the setting thereof. In some embodiments, the box device 200 may have limited memory and may not store information of operators' process feedbacks, and thus the box device 200 may not be configured to receive process feedbacks from the operators through the input devices.

The other two of the USB interfaces of the USB interface circuit 244 may be electrically coupled to the serial port bridge circuit 250. The serial port bridge circuit 250 may allow the expansion of the port number, for example, to eight ports 201-208. In some embodiments, the serial port bridge circuit 250 electrically connects the ports 201-204 to the components of the computing module 230, for example, through one of the USB interfaces of the USB interface circuit 244, and the serial port bridge circuit 250 electrically connects the ports 205-208 to the components of the computing module 230, for example, through another one of the USB interfaces of the USB interface circuit 244.

The isolation transceiver modules 292 are configured for signal communication and wire protection. In some embodiments, the isolation transceiver modules 292 allow signal communication between the ports 201-208 and the serial port bridge circuit 250 with reduced noise interference, while offering safety and insulation between connected apparatus (e.g., the auxiliary apparatuses 121-126). In some embodiments, the isolation transceiver modules 292 provide high insulation reliability under high temperature and high voltage, thereby keeping circuits of two adjacent ports 201-208 separated from other. In some embodiments, the isolation transceiver modules 292 can be transceiver devices that employs galvanic isolation to prevent mutual interference between apparatus (e.g., the auxiliary apparatuses 121-126). For example, the isolation transceiver modules 292 may be RS232 high-speed isolated transceiver module.

Galvanic isolation is the principle of physically and electrically separating two circuits, so that there is no direct conduction path but data and power can still be exchanged. Galvanic isolation may be achieved using transformers, optocouplers, or capacitors. For safety and equipment protection, the optocouplers may be use for isolating a control circuit from a power input network or other high-voltage circuits. For example, as power semiconductor devices are controlled under a low-voltage circuit and the driven by the optocouplers, thus the power semiconductor devices can be isolated from an output terminal of the low-voltage circuit.

The wireless transceiver 280 may include a wireless network antenna, which may adopt non-interference antenna module. The wireless network may use 5G WPA2 enterprise network, and therefore can effectively prevent other wireless signal interference issue. The interface buffer 294 may be disposed for reduce signal noise in signal transmission.

The enclosure 200E may be made of a suitable metal or alloy material with a suitable thickness for effective electromagnetic shielding. For example, the enclosure 200E may be made of the manganese ferroalloy material, the like, or the combination thereof. The enclosure 200E may be a dust-free metal enclosure. The enclosure 200E may be a box with openings 200EO on sidewalls for heat dissipation. The openings 200EO may have a suitable shape, such as ellipse shape, rectangular shape, the like, or the combination thereof. In some embodiments, the openings 200EO have a rectangular shape for improving heat dissipation efficiency.

Figure 4B:
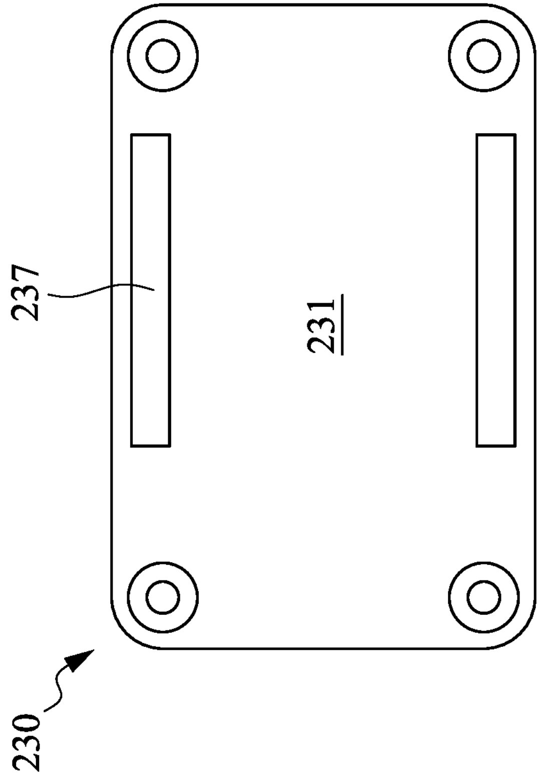
FIG. 4B is a bottom view of the computing module of FIG. 4A.
Figure 4A:
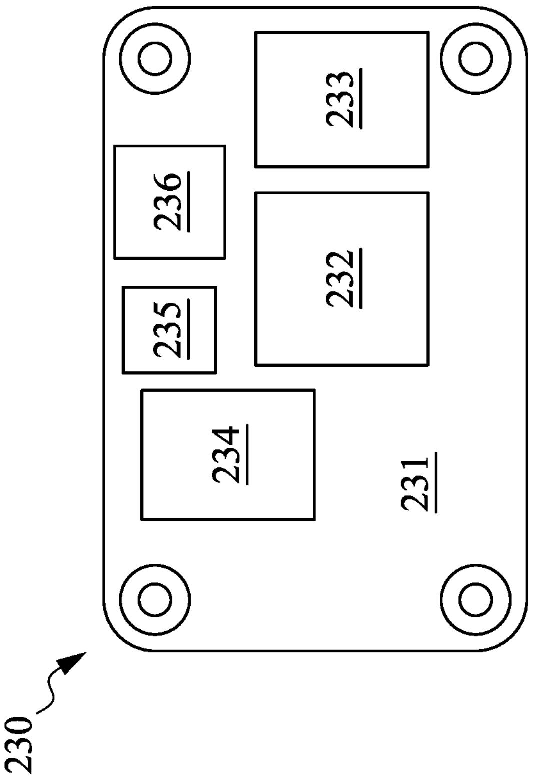
FIG. 4A is a top view of a computing module of the box device of FIGS. 3A and 3B.

Reference is made to FIGS. 4A and 4B. FIG. 4A is a top view of the computing module 230 of the box device of FIGS. 3A and 3B. FIG. 4B is a bottom view of the computing module 230 of FIG. 4A. The computing module 230 may include a main circuit board 231, a processor 232, a memory 233, a wireless module 234, an embedded Multi Media Card (EMMC) 253, an Ethernet physical layer (PHY) 236, and a board-to-board connector 237. The main circuit board 231 may be a printed circuit board supporting these components, and provide electrical connection among them.

The memory 233 is configured to store data and processing instructions. The processor 232 is coupled with memory 233 and configured to retrieve and execute the processing instructions stored in the memory 233. In some embodiments, a first one of the processing instructions may cause the processor 232 to automatically identify the type of the auxiliary apparatuses 121-126 (referring to FIG. 1A) and use its corresponding protocol format for data acquisition. For example, the processor 232 may use a protocol decoder for analyzing the logic signals and interpreting it according to a specific protocol format. In some embodiments, a second one of the processing instructions may cause the processor 232 to send a message to a corresponding one of the auxiliary apparatuses 121-126 (referring to FIG. 1A) to stop the corresponding one of the auxiliary apparatuses 121-126 (referring to FIG. 1A) and/or send an alert mail to related operators/inspectors when the operation data exceed a critical/threshold value. In some embodiments, a third one of the processing instructions may cause the processor 232 to automatically perform a protocol conversion from the communication protocol of the auxiliary apparatuses 121-126 (referring to FIG. 1A) to the communication protocol of the external application program 400 (referring to FIG. 1A). For example, a request from the external application program 400 (referring to FIG. 1A) is sent automatically to the box device 200, and the processor 232 performs the communication protocol conversion according to the request.

In some embodiments, the memory 233 may be a computer-readable medium, such as random access memory (RAM), read only memory (ROM), floppy disk, hard disk, flash memory or any other suitable form of digital storage. In some embodiments, the processor 232 may be a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The wireless module 234 is coupled to the processor 232. The wireless module 234 may be designed with a wireless antenna (e.g., the wireless transceiver 280) shared for Wi-Fi and Bluetooth for the application of the external application program 400 (referring to FIG. 1A) of external equipment or the software platform (e.g., the website platform 910 in FIG. 9). The EMMC 235 is coupled to the processor 232. The EMMC 235 may act as the primary storage for device, which can augment that storage of the device.

In some embodiments, the Ethernet PHY 236 is a transceiver component for transmitting and receiving data or Ethernet frames. The Ethernet PHY 236 forms the physical interface and is responsible for coding and decoding of data between a purely digital system and the medium on which the signals are transmitted. It thus represents a bridge between the digital and electrical connection levels of the interface. The board-to-board connector 237 may built electrical connection between the main circuit board 231 and the expansion board CB.

Figure 5:
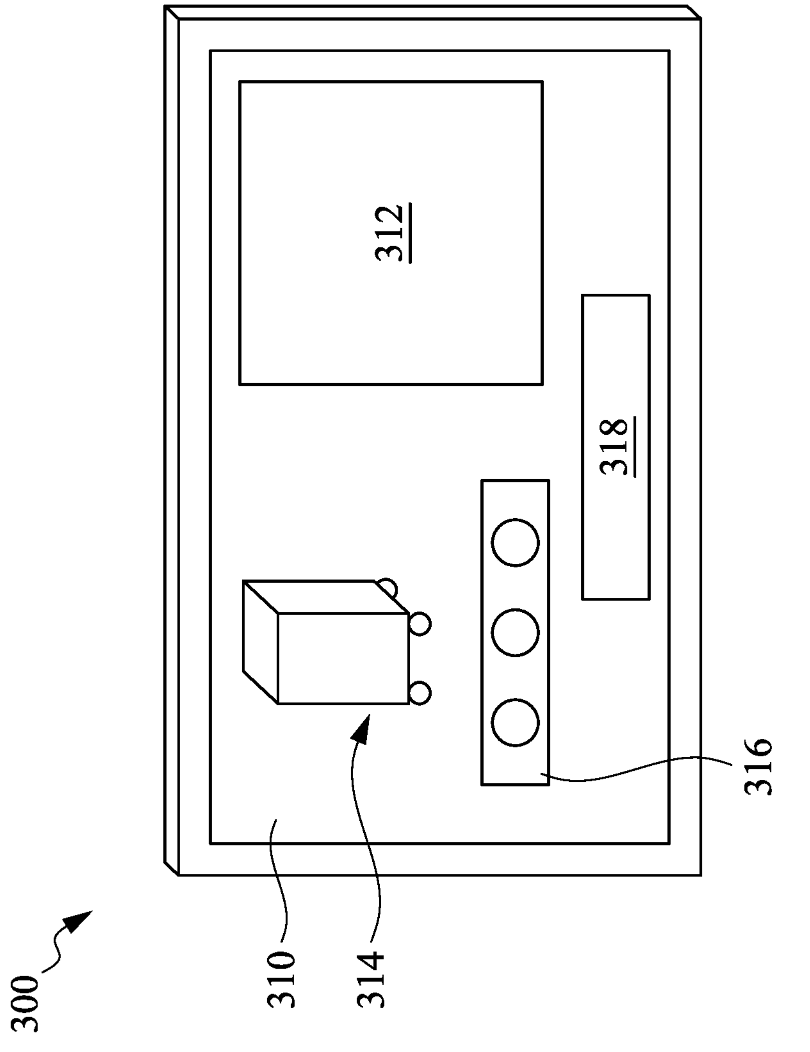
FIG. 5 is a front view of a display device according to some embodiments of the present disclosure.

FIG. 5 is a front view of a display device 300 according to some embodiments of the present disclosure. Reference is made to FIG. 1A and FIG. 5. The display device 300 may include a display screen 310. As aforementioned, the display screen 310 can real-time show the operation data 312 of the auxiliary apparatus, an appearance 314 of the auxiliary apparatus, a warning and alarm signal or preventive maintenance (PM) reminder signal 316, and the port information 318. In some embodiments, the display device 300 can include a touch film/screen integrated with the display screen 310, allowing user to swipe left and right to switch the information of auxiliary apparatuses 121-126 (e.g., operation data 312 and the appearance 314), a determination/comparison result (e.g., the warning and alarm signal or reminder signal 316), and information of the corresponding port 201-206 (e.g., the port information 318).

Figure 6:
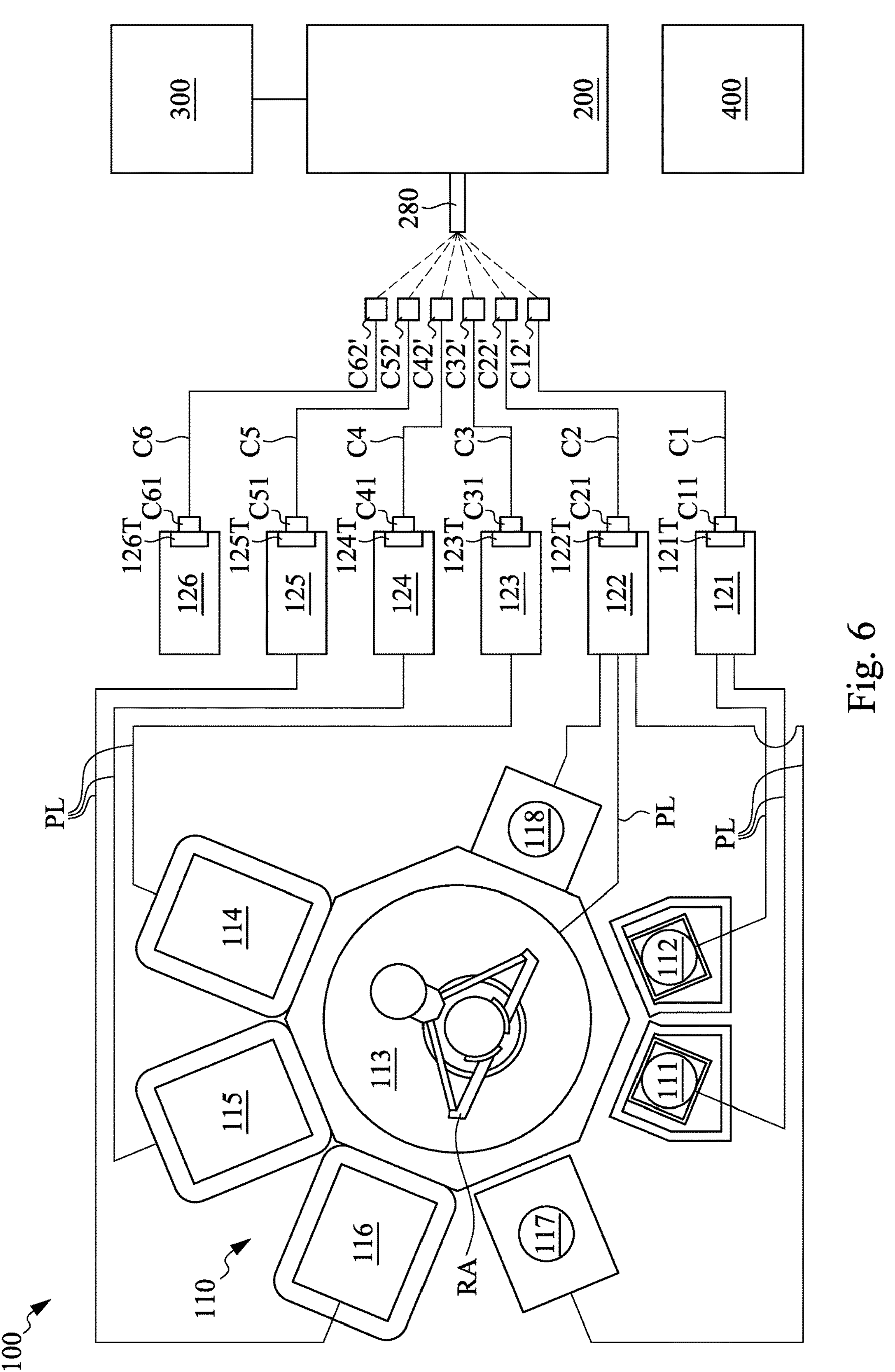
FIG. 6 is a diagrammatic top view of a semiconductor fabrication system according to some embodiments of the present disclosure.

FIG. 6 is a diagrammatic top view of a semiconductor fabrication system according to some embodiments of the present disclosure. Details of the present embodiments are similar to those of the embodiments of FIG. 1A, except that each of the connectors C1-C6 may include a wireless interface C12'/C22'/C32'/C42'/C62'. In some embodiments, each of the connectors C1-C6 may include a wireless transceiver, configured to send the gathered operation data across a wireless interface C12'/C22'/C32'/C42'/C62' to the box device 200. For example, the wireless transceiver may include a Bluetooth or WIFI module. The operation data are received by a wireless transceiver 280 of the box device 200, which then routes the data to the controller of the box device 200. As aforementioned, the computing module 230 of the box device 200 (referring to FIGS. 3B-4B) may decode the operation data of the auxiliary apparatuses 121-126 in various protocol formats. After the decoding, the display device 300 coupled to the box device 200 may show the operation data of the auxiliary apparatuses 121-126 on the screen thereof, as shown in FIG. 5. In some embodiments, after the decoding, the computing module 230 may convert the decoded operation data, for example, which uses RS232, to a communication protocol of an external application program 400. The external application program 400 may receive the operation data and adjust the process accordingly. Other details of the present embodiments are similar to those illustrated above, and therefore not repeated herein.

Figure 7:
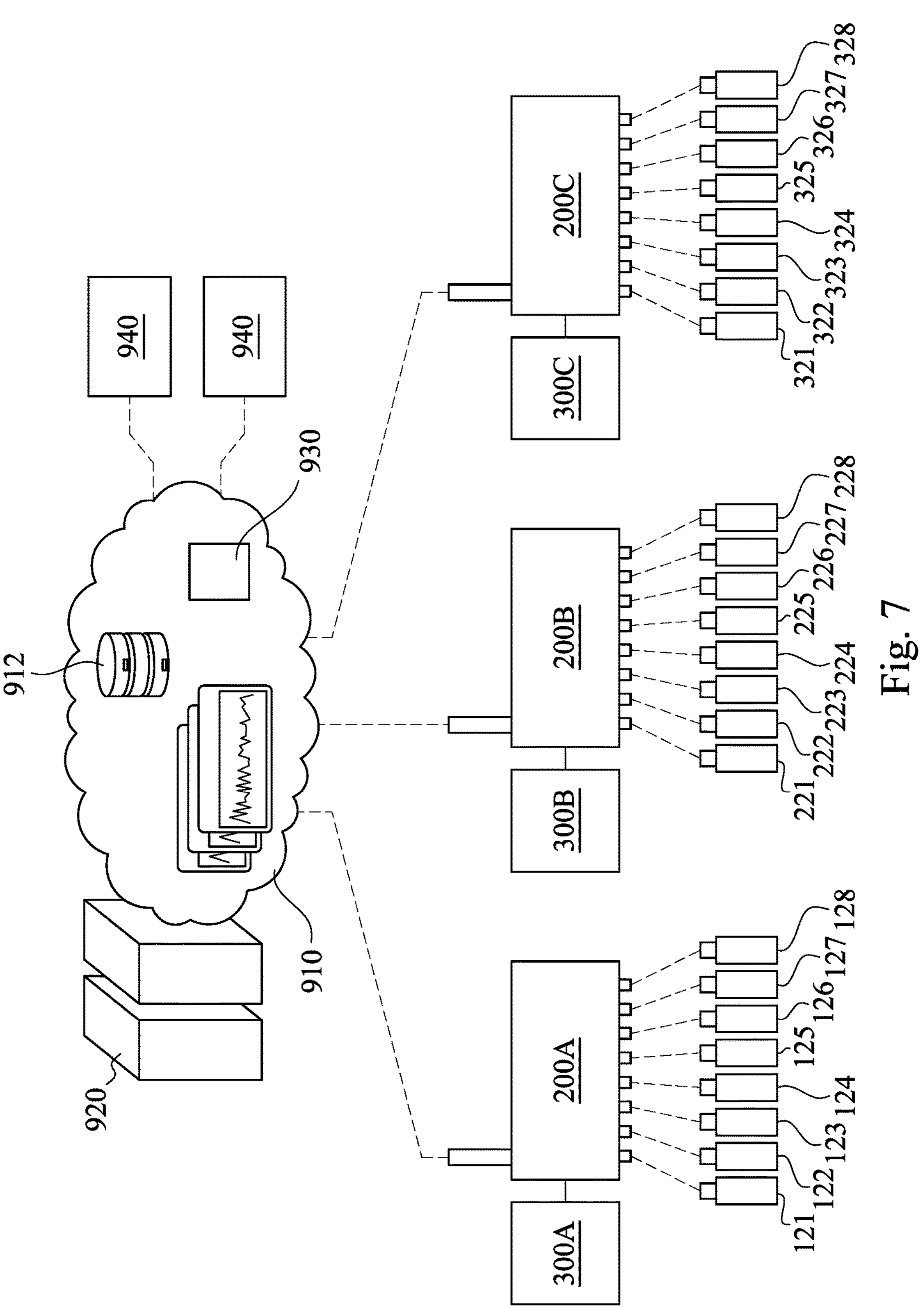
FIG. 7 is a diagrammatic view of a semiconductor fabrication system according to some embodiments of the present disclosure.

FIG. 7 is a diagrammatic view of a semiconductor fabrication system according to some embodiments of the present disclosure. After the operation data of various auxiliary apparatuses (e.g., auxiliary apparatuses 121-128, 221-228, and 321-328) are sent to the one or more box devices (e.g., box devices 200A, 200B, and 200C), the box devices (e.g., box devices 200A, 200B, and 200C) may decode the operation data, convert the operation data (for example, which uses RS232) to a communication protocol of a website platform 910, and then send the operation data of the various auxiliary apparatuses to a website platform 910. The website platform 910 may be a software platform, such as a cloud-based software platform. The website platform 910 may also be referred to as a pump central monitor platform. The website platform 910 may be hosted by one or more servers 920. The server 920 may be a computer device or program which manages and provides resources, data, services, or programs, over a network. These resources, data, services, or programs provided by the server 920 may collectively build the website platform 910. The server 920 may be referred to as a cloud-based server in some embodiments. The website platform 910 may real-time collect the operation data of the various auxiliary apparatuses 121-128, 221-228, and 321-328, and store the operation data in a database 912 of the website platform 910. Thus, the website platform 910 can show the chain chart of the operation data of the various auxiliary apparatuses 121-128, 221-228, and 321-328 in real time manner. In some embodiments, the website platform 910 may provide a history trend chart searching function by a type or an identity (ID) of the auxiliary apparatuses 121-128, 221-228, and 321-328. Through the configuration, the operators/inspectors may easily monitor the operation data of the auxiliary apparatuses 121-128, 221-228, and 321-328 on the display devices 300A-300C or the other devices (e.g., mobile devices, such as cell phones) 940 coupled to the website platform 910.

In some embodiments, the website platform 910 may have a preventive maintenance (PM) management system 930. The PM management system 930 may provide various functions, such as establishing/loading a PM schedule, providing PM checklist, and providing out of control action plan (OCAP). One or more input devices/interfaces (e.g., the devices 940) may be connected with the PM management system 930 for receiving operator's/inspectors' feedback. For example, operators/inspectors may give feedback through their devices (e.g., mobile devices, such as cell phones) 940 coupled to the PM management system 930. In some embodiments, the computing module 230 of the box device 200 may send the data to the website platform 910 for detailed processing and analysis. Thereafter, the website platform 910 makes a determination as to whether the operation data fall within an acceptable range.

In some embodiments, if the operation data is out of the acceptable range, the website platform 910 may instruct the PM management system 930 to send out a signal to tell the appropriate fabrication tool to make adjustments. For example, the website platform 910 (or the PM management system 930) may be designed with an auto trigger alarm mechanism to indicate that a parameter of the operation data of the auxiliary apparatuses 121-128, 221-228, and 321-328 is OOC or OOS. With the configuration of the website platform 910 including the PM management system 930, equipment history trend chart and PM maintenance record, schedule, checklist, etc., can be observed through the display device 300 or the other devices (e.g., mobile devices, such as cell phones) 940 coupled to the website platform 910.

With the configuration of the website platform 910, operators/inspectors may adjust the auxiliary apparatuses 121-128, 221-228, and 321-328 of a same type/model by the same criteria based on the monitored operation data. For example, when the auxiliary apparatuses 121-128 and 221-228 are respectively connected to a first cluster tool and a second cluster tool, the auxiliary apparatuses 121 and 221 are of a same type/model and may be adjusted by the same criteria. In some embodiments, the website platform 910 may include a cross comparison function for the benchmark among the auxiliary apparatuses 121-128, 221-228, and 321-328 (e.g., comparing signals among different auxiliary apparatuses).

Figure 8:
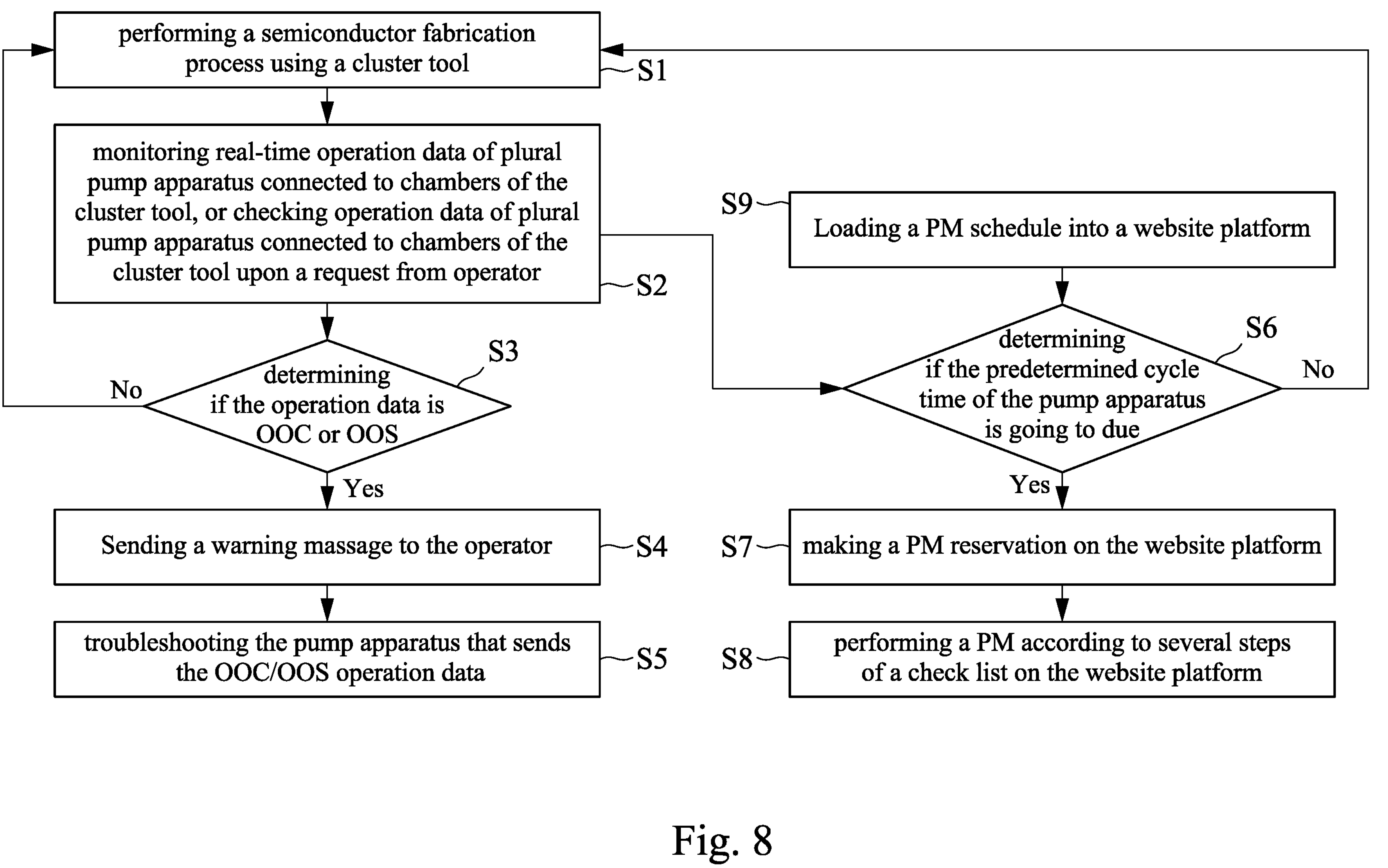
FIG. 8 is a flow diagram of a method for semiconductor fabrication according to some embodiments of the present disclosure.

Reference is made to both FIG. 1A and FIG. 8. FIG. 8 is a flow diagram of a method M for semiconductor fabrication according to some embodiments of the present disclosure. The method M includes steps S1-S9. It is understood that additional steps may be provided before, during, and after the steps S1-S9 shown in FIG. 8, and some of the steps S1-S9 described below can be replaced or eliminated for additional embodiments of the method. The order of the operations/processes may be interchangeable.

At step S1, a semiconductor fabrication process is performed using one or more cluster tools (e.g., the cluster tools 100 in FIGS. 1A and 6). As aforementioned, the semiconductor fabrication process may include ALD, CVD, PVD, etching, film coating, pre-treatment/pre-soak, de-gassing, as well as annealing, and/or other suitable processing or operations in FEOL or BEOL process.

At step S2, during the semiconductor fabrication process, real-time operation data of plural auxiliary apparatuses (e.g., auxiliary apparatuses 121-126 in FIGS. 1A and 6, and/or the auxiliary apparatuses 121-128, 221-228, and 321-328 in FIG. 7) are monitored by the box device (e.g., the box device 200 in FIGS. 1A and 6, and/or the box devices 200A-200C in FIG. 7). The operation data may include the aforementioned parameters, such as a current, a voltage, a pressure, a temperature, an operation time duration, the like, or the combination thereof. In some alternative embodiments, during the semiconductor fabrication process, the operation data of the auxiliary apparatuses 121-126 may be checked upon a request from operator at any time moment.

At step S3, the box device determines if at least one of the operation data of the auxiliary apparatuses (e.g., the real-time operation data and/or the operation data upon the request) is out of control (OOC) or out of spec (OOS). In the case of a result that the operation data is out of a predefined acceptance criteria range, the operation data is determined as OOC. In the case of a result that the operation data is out of an acceptance criterion range outlined by manufacturer, the operation data is determined as OOS.

When the at least one of the operation data of the auxiliary apparatuses is OOC or OOS, the method M proceeds to step S4, where the box device may send a warning massage to the operators/inspectors, for example, through the display device (e.g., the display device 300 in FIGS. 1A and 6, and/or the display devices 300A-300C in FIG. 7).

At step S5, after operator receives the warning massage, the operator may adjust or troubleshoot the auxiliary apparatus that sends the OOC/OOS operation data according to the OOC/OOS operation data. For example, the operator may stop the semiconductor fabrication process (e.g., turning off the cluster tools) and hold lot, and then troubleshoot the auxiliary apparatuses.

In some embodiments, if a pressure of a main/booster pump of the auxiliary apparatus (e.g., a pressure detected by the pressure sensor MPP/BPP in FIG. 2) is out of an acceptance range (e.g., OOC or OOS), the operators/inspectors may check one or more component of the corresponding auxiliary apparatus. According to the check results, an adjustment/troubleshooting action is made. For example, when a check result indicates that the process equipment is contaminated by high vapor pressure material, the operators/inspectors may clean the main/booster pumps with acetone or alcohol, or pump down with vacuum pump for a long time. When a check result indicates that an improper flow of vacuum pump oil, the operators/inspectors may clean oil ducts. When a check result indicates that discharge valves malfunctioning, the operators/inspectors may check each of discharge valves. When a check result indicates vacuum pump leaks, the operators/inspectors may check pump for leaks. In some further embodiments, the PM management system 930 (referring to FIG. 7) may include a program capable of automatically adjusting or troubleshooting the auxiliary apparatus according to the OOC/OOS operation data.

In some embodiments, if a temperature of a main/booster pump of the auxiliary apparatus (e.g., a temperature detected by the temperature sensor MPT/BPT in FIG. 2) is out of an acceptance range (e.g., OOC or OOS), the operators/inspectors may check one or more component of the auxiliary apparatus (e.g., one of the auxiliary apparatuses 121-126).

For example, the operators/inspectors may reduce a pressure across booster pump by lowering cut in pressure when the pressure differential too high. In some embodiments, the operators/inspectors may also check blank-off pressure of fore pump and system for leaks.

When all the operation data of the auxiliary apparatuses 121-126 are neither OOC nor OOS, the method M proceeds back to the step S1 to continue the semiconductor fabrication process.

At step S6, the box device (e.g., the box device 200 in FIGS. 1A and 6, and/or the box devices 200A-200C in FIG. 7) determines if the predetermined PM cycle time of at least one of the auxiliary apparatus (e.g., auxiliary apparatuses 121-126 in FIGS. 1A and 6, and/or the auxiliary apparatuses 121-128, 221-228, and 321-328 in FIG. 7) is going to due. The auxiliary apparatuses may have their own life time and predetermined PM cycle time, and the operating data of the auxiliary apparatuses (e.g., the real-time signal and/or the signal upon the request) may reveal their operating time. Thus, the box device may calculate a difference between the operating time and the predetermined PM cycle time. When the difference between the operating time and the predetermined PM cycle time is equal to or less than a threshold value (e.g., one to five days), the method M may proceed to step S7, where a preventive maintenance (PM) reservation is made. In some embodiments, when the difference between the predetermined PM cycle time to the operating time is equal to or less than the threshold value, the website platform 910 may automatically send a preventive maintenance (PM) reminder massage to the operator, and the operator may make a PM reservation. In some examples, the website platform may send a PM reservation reminder signal to the display devices 300A-300C through the box devices 200A-200C, the display devices 300A-300C show the PM reminder massage, thereby urging the operator to make the PM reservation. In some alternative examples, the website platform may send a PM reservation reminder signal to the device 940 that coupled to the website platform 910, a screen of the device 940 shows the PM reminder massage, thereby urging the operator to make the PM reservation. When the difference between the operating time and the predetermined PM cycle time is greater than a threshold value (e.g., one to five days), the method proceeds back to the step S1 to continue the semiconductor fabrication process.

At step S8, after a PM reservation is made at step S7, the operator/inspector may perform a PM according to several steps of a check list stored in the website platform (referring to FIG. 7). For example, the PM management system 930 (referring to FIG. 7) may provide the check list to the operators/inspectors. The operators/inspectors may follow the steps of the check list to perform the PM, and then send a result of PM back to the check list. If the result of PM sent to the check list is abnormal, the PM management system 930 (referring to FIG. 7) may provide an out of control action plan (OCAP) to the operators/inspectors. After the operators/inspectors finish the OCAP, the PM management system 930 may send OCAP to supervisors or other sponsors.

In some embodiments, a PM schedule is loaded to the PM management system 930 (referring to FIG. 7) at step S9. The PM schedule may have some parameters, such as a start time point of the auxiliary apparatuses, predetermined cycle time of the auxiliary apparatuses, the like, or the combination thereof. The determination step of step S6 may be made according to the parameters of PM schedule, the operation data of the auxiliary apparatus obtained at the step S2, or both.

In some embodiments, the determination step S3 and the warning step S4 may be performed by the box device, not on the website platform 910 (referring to FIG. 7). In some alternative embodiments, the box device (e.g., the box devices 200A-200C in FIG. 7) may send the signals to the website platform 910 (referring to FIG. 7), and the determination step S3 and the warning step S4 may be performed on the website platform 910 (referring to FIG. 7).

In absence of the box device, for onsite inspections, the large quantity and wide distribution of parameters lead to high loading on operators/inspectors. Huge parameters may be manually recorded for health check, which may lead to high loading on operators/inspectors and uncontrollable mis-operation.

In some embodiments of the present disclosure, the large-quantity and wide distributed of parameters are collected through the integrated intelligent box. The configuration of the integrated intelligent box is beneficial for reducing inspectors' or operator' loading and create an automation solution for management among various auxiliary apparatuses (e.g., pump apparatuses) for semiconductor industry.

Figure 9:
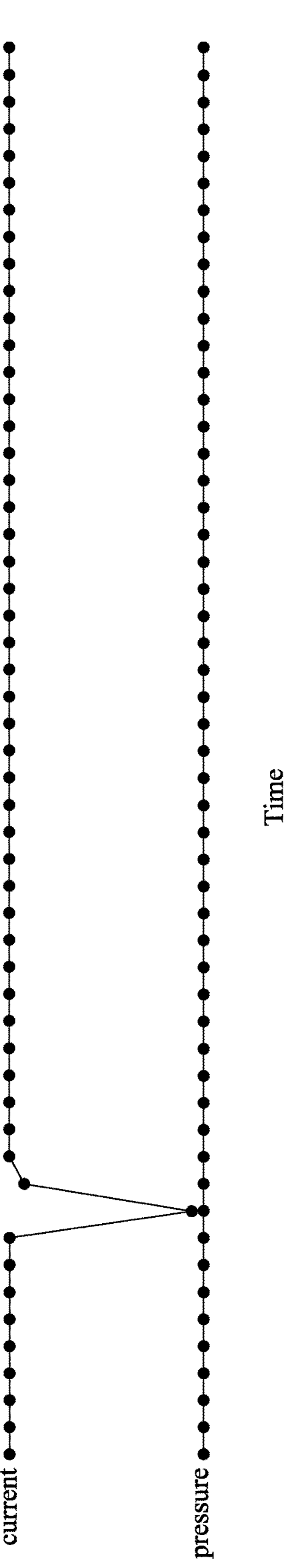
FIG. 9 is a diagram of real-time signals according to some embodiments of the present disclosure.

FIG. 9 is a diagram of real-time signals according to some embodiments of the present disclosure. In FIG. 9, time is shown on a horizontal axis, while a magnitude is shown on vertical axis. The operation data in real-time signals is illustrated as current and pressure in the present embodiments. The OOC current data is indicated by a circle. The real-time data can be shown on the display device 300 in FIG. 5 or shown on a screen of the device 940 that coupled to the website platform 910. Thus, once receiving the OOC/OOS data, operators/inspectors may observe the OOC/OOS data, and troubleshoot the vacuum apparatus.

Based on the above discussions, it can be seen that the present disclosure offers advantages. It is understood, however, that other embodiments may offer additional advantages, and not all advantages are necessarily disclosed herein, and that no particular advantage is required for all embodiments. One advantage is that the configuration of the integrated intelligent box is beneficial for reducing inspectors' or operator' loading and create an automation solution for management among various auxiliary apparatuses (e.g., pump apparatuses) for semiconductor industry. Another advantage is that an integrated intelligent box is provided to manage auxiliary apparatuses (e.g., pump apparatuses) remotely and convert the its protocol to a protocol for external application program accessing. Still another advantage is that a central monitor platform can be developed based on the box device, thereby displaying equipment history trend chart and PM maintenance record, schedule, checklist, etc.

According to some embodiments of the present disclosure, a method includes using a tool for processing a semiconductor substrate, wherein the tool comprises a first chamber and a second chamber; using a first pump apparatus to control a pressure condition of the first chamber, wherein the first pump apparatus produces a first operation data in a first digital protocol format; using a second pump apparatus to control a pressure condition of the second chamber, wherein the second pump apparatus produces a second operation data in a second digital protocol format different from the first digital protocol format; receiving, by a box device, the first operation data in the first digital protocol format and the second operation data in the second digital protocol format; decoding, by the box device, the first operation data in the first digital protocol format and the second operation data in the second digital protocol format; determining whether the first operation data is in a first acceptable range; and in response to the first operation data is out of the first acceptable range, adjusting the first pump apparatus to set the first operation data within the first acceptable range.

According to some embodiments of the present disclosure, a method includes building a connection between an output port of a first auxiliary apparatus and a first communication port of the box device; building a connection between an output port of a second auxiliary apparatus and a second communication port of the box device, wherein the output port of the second auxiliary apparatus is of a different type from the output port of the first auxiliary apparatus, and the first communication port of the box device is of a same type as the second communication port of the box device; monitoring, by a device coupled to the box device, a first operation data from the first auxiliary apparatus and a second operation data from the second auxiliary apparatus; and when the first operation data is out of the first acceptable range, displaying a warning massage on the display device.

According to some embodiments of the present disclosure, a system includes a first apparatus, a second apparatus, a box device, and a display device. The first pump apparatus provides a first operation data according to a first digital protocol format in a first communication protocol. The second pump apparatus provides a second operation data according to a second digital protocol format in the first communication protocol. The box device comprises a computing module, wherein the computing module is configured for receiving the first operation data according to the first digital protocol format and the second operation data according to the second digital protocol format in the first communication protocol. The display device is configured for displaying the first operation data and the second operation data.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

using a tool for processing a semiconductor substrate, wherein the tool comprises a first chamber and a second chamber;

using a first pump apparatus to control a pressure condition of the first chamber, wherein the first pump apparatus produces a first operation data in a first digital protocol format;

using a second pump apparatus to control a pressure condition of the second chamber, wherein the second pump apparatus produces a second operation data in a second digital protocol format different from the first digital protocol format;

when a first cable is connected between the first pump apparatus and a first box device, and a second cable is connected between the second pump apparatus and the first box device, automatically identifying, by the first box device, a type of the first pump apparatus and a type of the second pump apparatus;

receiving, by the first box device, the first operation data in the first digital protocol format and the second operation data in the second digital protocol format;

decoding, by the first box device, the first operation data in the first digital protocol format and the second operation data in the second digital protocol format;

determining whether the first operation data is in a first acceptable range; and in response to the first operation data is out of the first acceptable range, adjusting the first pump apparatus to set the first operation data within the first acceptable range.

2. The method of claim 1, further comprising:

sending the decoded first operation data and the decoded second operation data to a display device coupled to the first box device.

3. The method of claim 1, wherein receiving the first operation data and the second operation data by the first box device is performed based on a first communication protocol.

4. The method of claim 3, further comprising:

sending the decoded first operation data and the decoded second operation data to an external application program according to a second communication protocol different from the first communication protocol.

5. The method of claim 4, wherein the first communication protocol is RS232, and the second communication protocol is Transmission Control Protocol/Internet Protocol (TCP/IP), User Datagram Protocol (UDP), or SEMI Equipment Communication Standard (SECS).

6. The method of claim 1, further comprising:

sending the decoded first operation data and the decoded second operation data to a website platform using a wireless transceiver of the first box device.

7. The method of claim 6, further comprising:

using a third pump apparatus to control a pressure condition of a third chamber, wherein the third pump apparatus produces a third operation data in a third digital protocol format;

receiving, by a second box device, the third operation data in the third digital protocol format;

decoding, by the second box device, the third operation data in the third digital protocol format; and sending the decoded third operation data to the website platform using a wireless transceiver of the second box device.

8. The method of claim 1, further comprising:

determining whether the second operation data is in a second acceptable range; and in response to the second operation data is out of the second acceptable range, adjusting a controlling parameter of the second pump apparatus to set the second operation data within the second acceptable range.

9. The method of claim 1, wherein the first operation data corresponds to at least one of a current, a pressure, a temperature, and an operation time duration of the first pump apparatus, and the second operation data corresponds to at least one of a current, a pressure, a temperature, and an operation time duration of the second pump apparatus.

10. The method of claim 1, further comprising:

determining whether the first box device includes a suitable protocol decoder for the identified type of the first pump apparatus; and in response to determining the first box device does not include the suitable protocol decoder, installing a decoder program into the first box device remotely via a universal serial bus (USB) port or a network port of the first box device.

11. A method, comprising:

building a connection between an output port of a first auxiliary apparatus and a first communication port of a box device by a first cable;

building a connection between an output port of a second auxiliary apparatus and a second communication port of the box device by a second cable, wherein the output port of the second auxiliary apparatus is of a different type from the output port of the first auxiliary apparatus, and the second communication port of the box device is of a same type as the first communication port of the box device;

when the first cable builds the connection between the first auxiliary apparatus and the box device, and the second cable builds the connection between the second auxiliary apparatus and the box device, automatically identifying, by the box device, a type of the first auxiliary apparatus and a type of the second auxiliary apparatus;

monitoring, by a display device coupled to the box device, a first operation data from the first auxiliary apparatus and a second operation data from the second auxiliary apparatus; and when the first operation data is out of a first acceptable range, displaying a warning message on the display device.

12. The method of claim 11, wherein the first communication port of the box device and the second communication port of the box device are RJ45.

13. The method of claim 11, wherein the first cable is a N-to-one cable.

14. The method of claim 11, wherein the first auxiliary apparatus is a pump or a storage cabinet.

15. A system, comprising:

a first pump apparatus, providing a first operation data according to a first digital protocol format in a first communication protocol;

a second pump apparatus, providing a second operation data according to a second digital protocol format in the first communication protocol;

a box device, comprising a computing module, a first communication port, a second communication port, a first cable, and a second cable, wherein when the first cable is connected between the first pump apparatus and the first communication port, and the second cable is connected between the second pump apparatus and the second communication port, the computing module is configured to automatically identify a type of the first pump apparatus and a type of the second pump apparatus, wherein the computing module is further configured for receiving the first operation data according to the first digital protocol format and the second operation data according to the second digital protocol format in the first communication protocol; and a display device coupled to the box device, wherein the display device is configured for displaying the first operation data and the second operation data.

16. The system of claim 15, further comprising:

an external application program coupled to the box device for receiving the first and second operation data, wherein the computing module is further configured for converting the first and second operation data in the first communication protocol into the first and second operation data in a second communication protocol of the external application program, wherein the second communication protocol is different from the first communication protocol.

17. The system of claim 15, wherein the first communication port and the second communication port are of a same type.

18. The system of claim 17, wherein the first communication port and the second communication port are RJ45.

19. The system of claim 15, wherein the first pump apparatus comprises a first output port coupled to the box device, the second pump apparatus comprises a second output port coupled to the box device, and the first output port of the first pump apparatus and the second output port of the second pump apparatus are of different types.

20. The system of claim 15, wherein the box device further comprises a plurality of isolation transceiver modules coupled to the first communication port and the second communication port, respectively, wherein the plurality of isolation transceiver modules isolate the first communication port and the second communication port by using galvanic isolation.

* * * * *